UNITED STATES PATENT OFFICE.

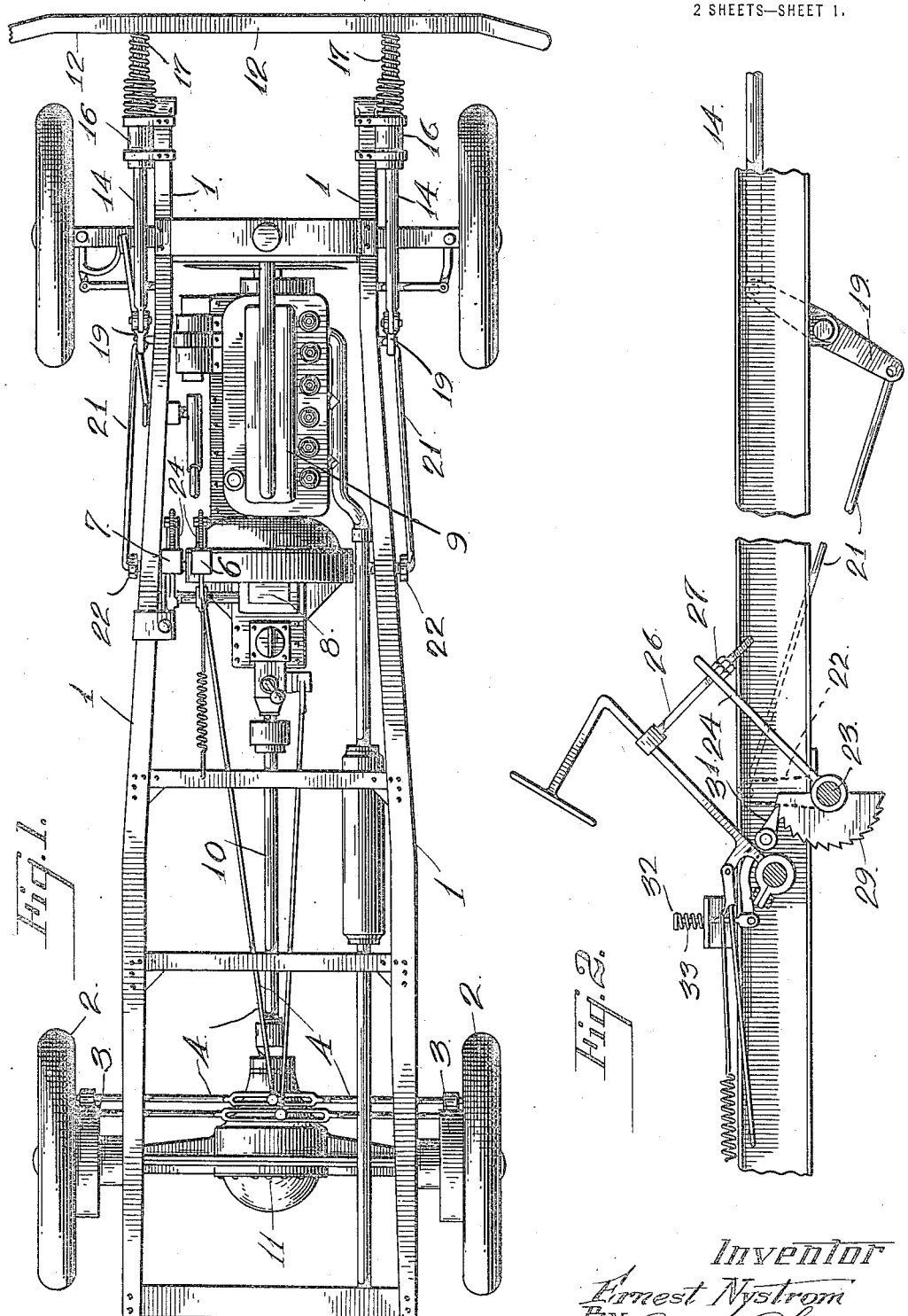

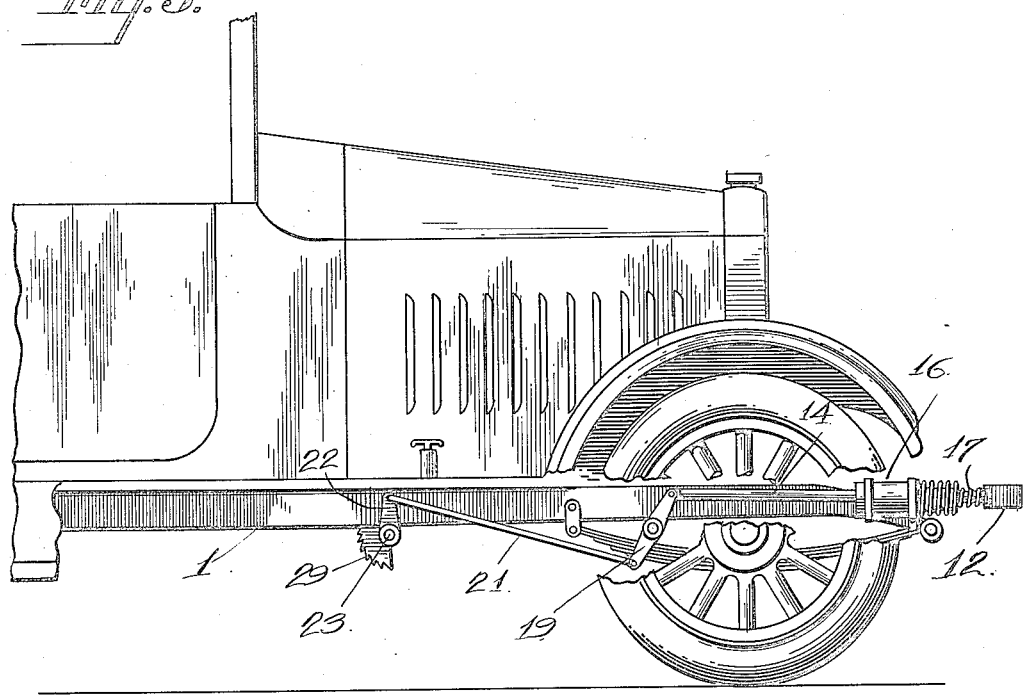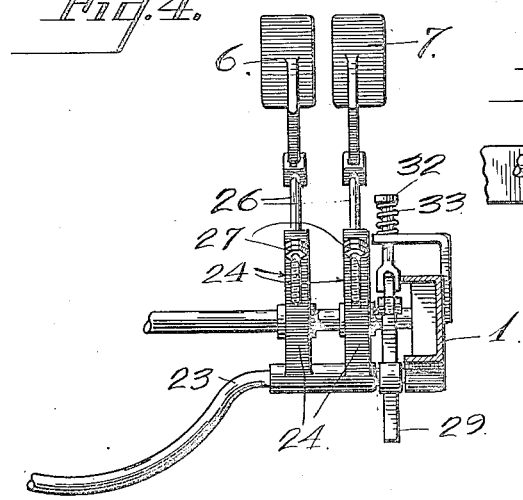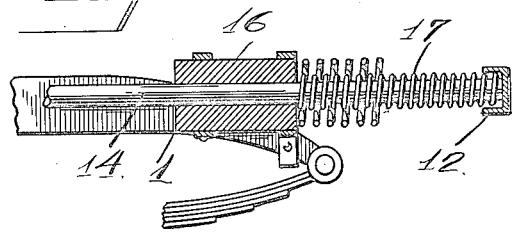

ERNEST NYSTROM, OF OAKLAND, CALIFORNIA.

MOTOR-VEHICLE BUMPER.

1,416,861.

Specification of Letters Patent.   Patented May 23, 1922.

Application filed January 10, 1921. Serial No. 436,394.

*To all whom it may concern:*

Be it known that I, ERNEST NYSTROM, a subject of the King of Sweden, and a resident of the city of Oakland, in the county of Alameda and State of California, have invented a new and useful Improvement in a Motor-Vehicle Bumper, of which the following is a specification.

My invention relates to improvements in motor vehicle bumpers, wherein a bumper is slidably mounted upon the front end of the vehicle and operates to actuate the clutch and brake pedals to retard further forward movement of the car or vehicle when the said bumper impinges against an obstruction within the path of said vehicle.

The primary object of the present invention is to provide improved means for automatically retarding forward movement of the vehicle after impact with an obstruction in the path thereof.

A further object of the invention is to provide improved means for automatically releasing and setting respectively the clutch and brake pedals of a motor vehicle when meeting with an obstruction within the path of said vehicle when in motion, to the end that further movement of said vehicle, after striking such obstruction or object within its path, will be resisted to prevent impact of said vehicle with other and successive obstructions or objects.

I accomplish these several objects by means of the device disclosed in the drawings forming part of the present specifications wherein like characters are used to designate similar parts throughout the said specification and drawings, and in which—

Fig. 1 is a plan view of the chassis of a motor vehicle disclosing my invention applied thereto;

Fig. 2 is an enlarged broken detailed view disclosing the manner in which the clutch and brake pedals are engaged;

Fig. 3 is an enlarged broken side elevation of the front portion of a motor vehicle disclosing my improvement attached thereto;

Fig. 4 is an enlarged broken right hand elevation of Fig. 2; and

Fig. 5 is an enlarged broken detailed view of the resilient means for normally retaining the bumper in an extended position.

Referring to the drawings the numeral 1 is used to designate the chassis of a motor vehicle having the usual rear or propelling wheels 2 mounted at the rear end thereof and provided with braking elements 3 operatively connected by means of suitable rods 4, to the service brake pedal 6.

A clutch pedal 7 operates through a transmission 8 in the usual manner, to connect or disconnect the motor 9 from the propeller shaft 10 which is connected through the medium of the differential 11 with the rear wheels 2 to move the vehicle forward.

Mounted upon the front end of the chassis 1 is a bumper 12 having rearwardly extending members 14 slidably mounted within suitable bearings 16 on the forward end of the chassis 1. Suitable springs 17 are interposed between said bearings 16 and the bumper 12 to resiliently retard rearward movement of said bumper during impact with an obstacle within the path of the vehicle when moving.

Pivotally connected to the inner ends of the members 14 are levers 19 in turn pivotally mounted upon each side of the chassis 1 and connected at their opposite ends, by means of suitable rods 21, to arms 22 at opposite ends of a shaft 23 rotatably mounted within the chassis 1 and transversely thereto and adjacent the clutch and brake pedals 7 and 6 respectively.

A pair of arms 24 are rigidly mounted upon the shaft 22 and are operatively connected to the clutch and brake pedals 7 and 6, respectively, by means of rods 26 passing through said arms 24 and having nuts 27 arranged on said rods 26 and below said arms 24 whereby said pedals 6 and 7 may be operated independently of the arms 24, the upper ends of said rods 26 being loosely connected to the pedals to permit flexibility of movement of said rods 26.

Rigidly connected to the shaft 23 is a ratchet 29. A pawl 31 is pivotally mounted upon the adjacent portion of the chassis 1 and is provided with a spring controlled releasing member 32 operable by an operator of the motor vehicle to release the pawl 31 from the ratchet 29 when said releasing member 32 is depressed against the tension of a spring 33 provided to normally retain engaging relation of the pawl 31 with the ratchet 29.

In operation, when the chassis or vehicle is in motion and the bumper 12 comes in contact with an obstacle or obstruction within the path of said vehicle impingement of said bumper will cause the same to be moved rearwardly to actuate the arms 22, the direction of movement being reversed by the levers 19 so that the members 21, being in tension when working, may be light in weight and structure. The tension, then of the rods or members 21 will actuate the shaft 23 and arms 24 thereon to respectively release and set the clutch and brake pedals, thereby disconnecting the vehicle from its motive power and applying the brakes to retard or prevent further movement of said vehicle whereby contact or impact with other and successive objects, such as might occur should the vehicle be running down hill, may be prevented.

The initial shock of the impact is of course taken up by the resiliency of the springs 17 which springs also serve to normally and resiliently retain the bumper in an extended or operative position.

As the shaft 23 is partially rotated by action of the rods or members 21 the ratchet 29 is also partially rotated while the pedals are being set. A return movement of the ratchet 29 is prevented by engagement of the pawl 31 with said ratchet so that the setting of the clutch and brake pedals to prevent further progress of the vehicle is automatically locked by said pawl 31.

When it is desired to again move the vehicle forward, the pedals 6 and 7 may be easily and readily released by the simple expedient of depressing the member 32 against the tension of the spring 33 which will operate to release the pawl 31 from the ratchet 29 and thereby permit return of the pedals to normal position.

The advantage of this novel feature is that when a motor vehicle is running the first impact with an obstruction will disconnect the power and set the brakes to retard further progress or movement of the vehicle and thereby prevent impingement or violent impact with successive objects which might operate to damage the said vehicle.

Having thus described my invention what I claim as new and desire to secure by Letters Patent is:—

1. The combination with a motor vehicle of a bumper slidably mounted upon the front thereof; a pair of arms operatively connected to the bumper; means for adjustably connecting said arms with the clutch and brake pedals of the vehicle for actuating the same when the bumper is moved rearwardly toward the vehicle; means for normally retaining said bumper in its forward position; means for automatically engaging and retaining said pedals in their respective positions after movement by the bumper; and means operable by the operator of the vehicle for releasing said retaining means to permit the pedals to return to their normal positions.

2. The combination with a motor vehicle of a bumper slidably mounted upon the front thereof; a rocking shaft mounted adjacent the clutch and brake pedals of the vehicle; means connecting the bumper and the shaft to partially rotate said shaft when the bumper is moved rearwardly toward the vehicle; arms secured upon the shaft; connections secured upon the pedals and arranged to slidably engage the arms to permit said pedals to be normally depressed independently from said arms; and adjustable means mounted upon said connections arranged to engage said arms to actuate said pedals to a depressed position when the shaft is turned by the rearward movement of the bumper.

3. The combination with a motor vehicle of a bumper slidably mounted upon the front thereof; a rocking shaft mounted adjacent the clutch and brake pedals; means operatively connecting the bumper and the shaft to partially rotate said shaft when the bumper is moved rearwardly toward the vehicle; arms secured upon the shaft in alignment with the pedals; connections secured upon the pedals and arranged to slidably engage said arms to permit said pedals to be depressed independently from the arms; and nuts threaded upon said connections adjacent the arms to be engaged by said arms to depress the pedals when said arms are depressed by the turning of the shaft due to a rearward movement of the bumper, said nuts being adjustable for regulating the amount of movement of the pedals when actuated by the arms.

4. The combination with a motor vehicle of a bumper slidably mounted upon the front thereof; a rocking shaft mounted adjacent the clutch and brake pedals; means operatively connecting the bumper and the shaft to partially rotate said shaft when the bumper is moved rearwardly toward the vehicle; arms secured upon the shaft in alignment with the pedals; connections secured upon the pedals and arranged to slidably engage said arms to permit said pedals to be depressed independently from the arms; nuts threaded upon said connections adjacent the arms to be engaged by said arms to depress the pedals when said arms are depressed by the turning of the shaft due to a rearward movement of the bumper, said nuts being adjustable for regulating the amount of movement of the pedals when actuated by the arms; and means for normally retaining said bumper in a forward position.

5. The combination with a motor vehicle of a bumper slidably mounted upon the front thereof; a rocking shaft mounted adjacent the clutch and brake pedals; means operatively connecting the bumper and the shaft to partially rotate said shaft when the bumper is moved rearwardly toward the vehicle; arms secured upon the shaft in alignment with the pedals; connections secured upon the pedals and arranged to slidably engage said arms to permit said pedals to be depressed independently from the arms; nuts threaded upon said connections adjacent the arms to be engaged by said arms to depress the pedals when said arms are depressed by the turning of the shaft due to a rearward movement of the bumper, said nuts being adjustable for regulating the amount of movement of the pedals when actuated by the arms; means for normally retaining said bumper in a forward position; means for automatically engaging and retaining said pedals in their respective positions after movement by the bumper; and means operable by the operator of the vehicle for releasing said retaining means to permit a return of the bumper and pedals to their normal positions.

In witness whereof I hereunto set my signature.

ERNEST NYSTROM.